(12) United States Patent
Shimizu

(10) Patent No.: US 11,598,731 B2
(45) Date of Patent: Mar. 7, 2023

(54) INSPECTION METHOD FOR ELECTRODE STRUCTURAL BODY

(71) Applicant: Honda Motor Co., Ltd., Tokyo (JP)

(72) Inventor: Hiroaki Shimizu, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 249 days.

(21) Appl. No.: 17/031,952

(22) Filed: Sep. 25, 2020

(65) Prior Publication Data

US 2021/0096089 A1 Apr. 1, 2021

(30) Foreign Application Priority Data

Sep. 30, 2019 (JP) .............................. JP2019-180520

(51) Int. Cl.
*G01N 23/18* (2018.01)
*G01N 23/046* (2018.01)
(Continued)

(52) U.S. Cl.
CPC ......... *G01N 23/046* (2013.01); *G01N 23/083* (2013.01); *G01N 23/18* (2013.01);
(Continued)

(58) Field of Classification Search
CPC .... G01N 23/046; G01N 23/083; G01N 23/18; G01N 2223/04; G01N 2223/408;
(Continued)

(56) References Cited

U.S. PATENT DOCUMENTS

2008/0270081 A1* 10/2008 Bearup ................ G01R 31/307
702/189
2012/0148114 A1* 6/2012 Ikubo ..................... G06V 10/98
382/112

(Continued)

FOREIGN PATENT DOCUMENTS

JP 2002290994 10/2002
JP 2003042975 2/2003

(Continued)

OTHER PUBLICATIONS

Office Action of Japan Counterpart Application, with English translation thereof, dated Jun. 22, 2021, pp. 1-6.

(Continued)

*Primary Examiner* — David P Porta
*Assistant Examiner* — Mamadou Faye
(74) *Attorney, Agent, or Firm* — JCIPRNET

(57) ABSTRACT

The disclosure provides an inspection method determining whether there is a defect in an electrode structural body including a cathode electrode layer, an electrolyte layer and an anode electrode layer electrode by an image processor. The inspection method includes a step of scanning the electrode structural body along a scanning direction to obtain a continuous transmission image, a step of digitizing a shade of each pixel of the transmission image, a step of calculating a difference value between a grayscale of a specific pixel and a median value of grayscales of comparison pixels located in front or rear of the specific pixel along (Continued)

the scanning direction, and a step of determining presence or absence of the defect according to the difference value and a predetermined threshold value.

6 Claims, 8 Drawing Sheets

(51) Int. Cl.
    *G01N 23/083*     (2018.01)
    *G06T 7/00*     (2017.01)
    *G06T 11/00*     (2006.01)

(52) U.S. Cl.
    CPC .......... *G06T 7/0012* (2013.01); *G06T 11/008* (2013.01); *G01N 2223/04* (2013.01); *G01N 2223/408* (2013.01); *G01N 2223/419* (2013.01); *G01N 2223/42* (2013.01); *G01N 2223/426* (2013.01); *G06T 2207/10081* (2013.01)

(58) Field of Classification Search
    CPC .......... G01N 2223/419; G01N 2223/42; G01N 2223/426; G01N 23/04; G06T 7/0012; G06T 11/008; G06T 2207/10081; G06T 2207/30136; G06T 7/001; Y02E 60/50; H01M 8/1004
    See application file for complete search history.

(56) References Cited

U.S. PATENT DOCUMENTS

| | | | |
|---|---|---|---|
| 2017/0003239 A1 | 1/2017 | Jeong et al. | |
| 2019/0145913 A1* | 5/2019 | Fukuda | G01N 23/04 378/58 |
| 2019/0173128 A1 | 6/2019 | Visco et al. | |

FOREIGN PATENT DOCUMENTS

| | | |
|---|---|---|
| JP | 2006049845 | 2/2006 |
| JP | 2007265970 | 10/2007 |
| JP | 2008304416 | 12/2008 |
| JP | 2012129743 | 7/2012 |
| JP | 2014225340 | 12/2014 |
| WO | 2016174926 | 11/2016 |
| WO | 2017183493 | 10/2017 |

OTHER PUBLICATIONS

"Office Action of Japan Counterpart Application", dated Dec. 21, 2021, with English translation thereof, p. 1-p. 6.

* cited by examiner

INSPECTION METHOD FOR ELECTRODE STRUCTURAL BODY

CROSS-REFERENCE TO RELATED APPLICATION

This application claims the priority benefit of Japan application serial no. 2019180520, filed on Sep. 30, 2019. The entirety of the above-mentioned patent application is hereby incorporated by reference herein and made a part of this specification.

BACKGROUND

Technical Field

The disclosure relates to an inspection method for an electrode structural body, and more particularly, to an inspection method for an electrode structural body which determines whether there is a defect in an electrode structural body including a cathode electrode layer, an electrolyte layer and an anode electrode layer.

Description of Related Art

A membrane electrode assembly (MEA) for a fuel cell includes an electrolyte film and two electrode layers joined to two surfaces of the electrolyte film. One of the electrode layers functions as an anode, and the other one of the electrode layers functions as a cathode. Further, the electrode layers have a layered structure including, for example, a gas diffusion layer (GDL) and a gas diffusion electrode (GDE). The GDL is formed by, for example, coating one surface of a sheet-shaped porous material (e.g., carbon paper) having electrical conductivity and acid resistance with a material obtained by mixing a carbon material, a water repellent material and the like, and forming a water repellent layer. Also, the GDE is formed by coating the water repellent layer in an overlapping manner with a material obtained by mixing a catalyst, an electrolyte polymer, a conductive material, and the like.

In a fuel cell adopting a MEA with this kind of layered structure, in order to maximize performance of the fuel cell, the cathode electrode layer or the anode electrode layer has to be formed with an adequate thickness and has no defect inside. Therefore, conventionally, a transmission image of the MEA is captured by an X-ray computed tomography (CT) apparatus (for example, see Patent Document 1), and is visually checked, so as to determine whether there is a defect in the electrode layer.

RELATED ART

Patent Document

Patent Document 1: Japanese Laid-open No. 2007-265970

FIG. 8 is an example of the transmission image of the MEA. As indicated by a broken line in FIG. 8, when there is a defect in a portion of the electrode layer of the fabricated MEA, the portion where the defect exists becomes lighter than the surroundings. If a defect is as large as the defect shown in FIG. 8, the presence of the defect may easily be visually identified. However, in a case of visually identifying a defect having a size of about several pixels, it would be necessary to enlarge the transmission image before checking the transmission image, and therefore the inspection process takes time.

In such a case, it would be conceivable that the presence of the defect may be automatically determined by a computer. That is, as described in the above, since the portion where the defect exists is lighter, the presence of the defect may be numerically determined if a shade of each pixel of the captured transmission image is digitized by the computer. However, since the shade of the transmission image may gradually vary during a process of continuously scanning a long MEA by the X-ray CT apparatus, it may be difficult to correctly determine whether there is a defect by simply digitizing the shade of each pixel.

SUMMARY

The disclosure provides an inspection method for an electrode structural body. The inspection method determines by a computer whether there is a defect in the electrode structural body including a cathode electrode layer, an electrolyte layer and an anode electrode layer. The inspection method includes: a first step including scanning the electrode structural body along a scanning direction to obtain a continuous transmission image of the electrode structural body; a second step including digitizing a shade of each pixel of the transmission image; a third step including calculating a difference value between a value calculated according to a grayscale of a specific pixel and a value calculated according to a plurality of grayscales of a plurality of comparison pixels located in front or rear of the specific pixel along the scanning direction; and a fourth step including determining presence or absence of the defect according to a comparison performed between the difference value and a predetermined threshold value.

DESCRIPTION OF THE EMBODIMENTS

Figure 1:
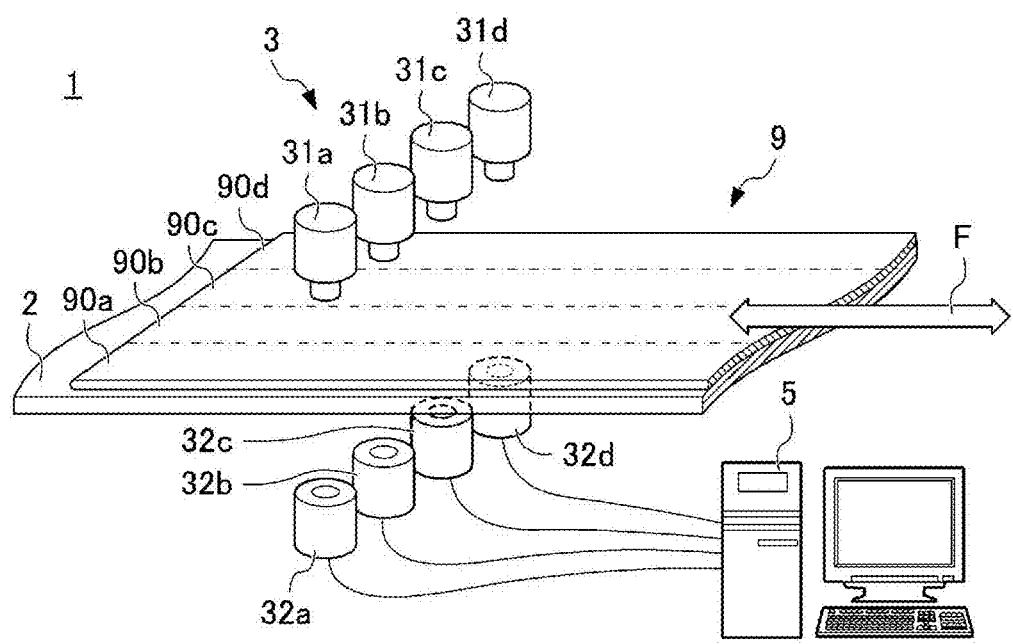
FIG. 1 is a schematic diagram illustrating a configuration of an inspection apparatus to which an inspection method for an electrode structural body is applied according to an embodiment of the disclosure.

In view of this, the disclosure provides an inspection method for an electrode structural body, which can quickly and precisely determine whether there is a defect in an electrode structural body including a cathode electrode layer, an electrolyte layer and an anode electrode layer.

(1) According to the disclosure, an inspection method is a method for determining by a computer (e.g., an image processor 5 described below) whether there is a defect in an electrode structural body (e.g., an electrode structural body 9 described below) including a cathode electrode layer (e.g., a cathode electrode layer 91 described below), an electrolyte layer (e.g., an electrolyte film 90 described below) and an anode electrode layer (e.g., an anode electrode layer electrode 93 described below). The inspection method includes a first step (e.g., a step S1 shown in FIG. 3 described below) including scanning the electrode structural body along a scanning direction (e.g., a scanning direction F described below) to obtain a continuous transmission image, a second step (e.g., a step S3 shown in FIG. 3 described below) including digitizing a shade of each pixel of the transmission image, a third step (e.g., a step S4 shown in FIG. 3 described below) including calculating a difference value between a value calculated according to a grayscale of a specific pixel and a value calculated according to grayscales of comparison pixels located in front or rear of the specific pixel along the scanning direction, and a fourth step (e.g., a step S7 shown in FIG. 3 described below) including determining whether presence or absence of the defect according to the difference value and a predetermined threshold value (e.g., a determination threshold value described below).

(2) According to an exemplary embodiment, in an edge region (e.g., edge regions 95, 96 described below) located on two sides of the electrode structural body with respect to the scanning direction, neither of the cathode electrode layer and the anode electrode layer exists, or one of the cathode electrode layer and the anode electrode layer does not exist. In the first step, the scanning is performed in order to include the edge regions of the electrode structural body. In the third step, the difference value is calculated by setting at least one pixel located in the edge region to be the specific pixel.

(3) According to an exemplary embodiment, the threshold value is set according to the difference value calculated in the third step.

(4) According to an exemplary embodiment, in the third step, a plurality of pixels adjacent to and located in front or rear of the specific pixel along the scanning direction are defined as the comparison pixels, and a difference between the grayscale of the specific pixel and a median value of the grayscales of the plurality of comparison pixels is calculated and used as the difference value.

(5) According to an exemplary embodiment, a fifth step is further included, and includes outputting a report including an original image display section displaying an original image obtained in the first step and a difference value display section displaying the difference value calculated in the third step side by side with the original image.

(1) According to the inspection method of the disclosure, the continuous transmission image of the electrode structural body is obtained by scanning the electrode structural body along the scanning direction, and thereafter the grayscale of each pixel of the obtained transmission image is digitized. According to the inspection method, the difference value between the value calculated according to the grayscale of the predetermined specific pixel and the value calculated according to the grayscales of the comparison pixels located in front or rear of the specific pixel along the scanning direction is calculated, and the presence or absence of a defect is determined based on the comparison performed between the difference value and the predetermined threshold value. Here, when a portion of the electrode layers forming the electrode structural body has a defect, grayscales of pixels located in the portion where the defect exists are lighter than grayscales of pixels located in another portion where there is no defect. Therefore, when there is a defect in the specific pixel and there is no defect in the comparison pixels in front or rear of the specific pixel, the difference value calculated based on the above-described method exceeds the threshold value and becomes large. According to the disclosure, by calculating the difference value for each pixel of the transmission image in order by the computer, it is possible to determine whether there is a defect in a shorter time than the case of visually inspecting the transmission image. Further, as described in the above, when the electrode structural body is continuously scanned by the X-ray CT apparatus, the shade of the transmission image may gradually change along the scanning direction due to variations in an imaging environment. Therefore, when the presence or absence of a defect is determined merely by the grayscale of the specific pixel, it may be erroneously determined. In comparison, according to the disclosure, the difference value between the value calculated according to the grayscale of the specific pixel and the value calculated based on the grayscales of the comparison pixels located in front or rear of the specific pixel along the scanning direction is used. As such, since a boundary between the portion where the defect exists and the region where there is no defect may be captured and regarded as a sharp change in shade along the scanning direction of the transmission image, it is possible to determine whether there is a defect with high accuracy regardless of the variations of the imaging environment during scanning.

(2) On the two sides of the electrode structural body, there is an edge region in which neither of the cathode electrode layer and the anode electrode layer exists, or one of the cathode electrode layer and the anode electrode layer does not exist. Since this kind of edge region does not directly contribute to power generation, there is no need to determine whether there is a defect therein. Therefore, according to the disclosure, the scanning is performed to include the edge region which is not required to be inspected, and the difference value is calculated under a configuration that a pixel located in the edge region is set as the specific pixel. As such, since the boundary between the edge region where neither of the cathode electrode layer and the anode electrode layer exists or one of the cathode electrode layer and the anode electrode layer does not exist and the region where both electrode layers exist may be identified, a region to be inspected for the presence or absence of a defect may be specified.

(3) According to the disclosure, the threshold value is set based on the difference value including the pixel located in the edge region. As such, it is possible to accurately determine whether there is a defect based on the difference value of the edge region.

(4) When the electrode structural body is scanned along the scanning direction by the X-ray CT apparatus as described in the above, the shade of the transmission image may gradually change due to variations of the imaging environment. Therefore, according to the disclosure, the plurality of pixels adjacent to and located in front or rear of the specific pixel along the scanning direction are defined as the comparison pixels, and the difference between the grayscale of the specific pixel and the median value of the grayscales of the plurality of comparison pixels are calculated and used as the difference value. As a result, since it is possible to emphasize a sharp change in difference values while a gradual change in shade caused by variations of the imaging environment is ignored, it is possible to more accurately determine whether there is a defect.

(5) According to the disclosure, the report including the original image display section displaying the original image obtained in the first step and the difference value display section displaying the difference value calculated in the third step side by side with the original image is outputted. By outputting this kind of report, convenience of visual inspection performed by an operator may be enhanced. That is, even if it is difficult to recognize a defect merely by glancing at the original image, the operator may mark the area where a defect is considered to exist by referring to the difference value display section. In addition, the operator may enlarge the area of the original image where the defect is considered to exist and determine whether a size of the present defect is acceptable by close visual inspection.

Hereinafter, an inspection method for an electrode structural body according to an embodiment of the disclosure will be described with reference to the drawings.

FIG. 1 is a schematic diagram illustrating a configuration of an inspection apparatus 1 to which the inspection method for an electrode structural body is applied according to an embodiment of the disclosure. The inspection apparatus 1 includes an inspection stage 2 on which a strip-shaped electrode structural body 9 to be inspected is placed, a carrier device (not shown) for moving the electrode structural body 9 on the inspection stage 2, an X-ray computed tomography (CT) apparatus 3 which captures a transmission image of the electrode structural body 9, and an image processor 5 which is a computer determining whether there is a defect in the electrode structural body 9 according to the transmission image captured by the X-ray CT apparatus 3.

The electrode structural body 9 has a long strip shape and is a component for a fuel cell. A portion of the electrode structural body 9 cut out in a rectangular shape is employed as a membrane electrode assembly (MEA) in a fuel cell.

Figure 2:
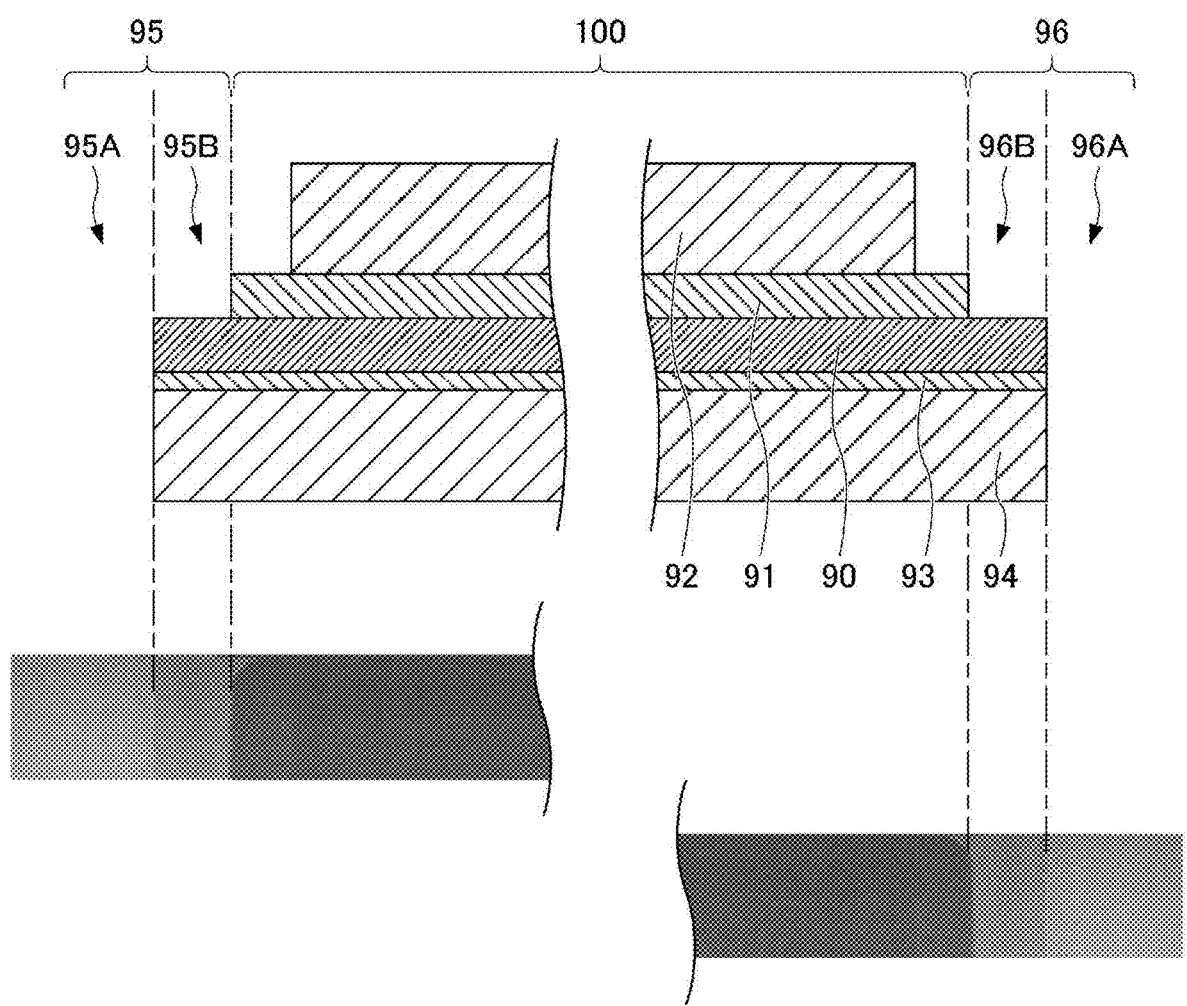
FIG. 2 is a cross-sectional view of a front end and a rear end of an electrode structural body and an example of a transmission image obtained by capturing the front end and the rear end by an X-ray computed tomography (CT) apparatus.

FIG. 2 is a cross-sectional view (upper half) of a front end and a rear end of the electrode structural body 9 and an example (lower half) of the transmission image obtained by capturing the front end and the rear end by the X-ray CT apparatus 3. As shown in FIG. 2, the electrode structural body 9 has a layered structure. The electrode structural body 9 includes an electrolyte film 90, a cathode electrode layer 91 joined to one surface of the electrolyte film 90, a cathode gas diffusion layer 92 joined to the cathode electrode layer 91, an anode electrode layer 93 joined to the other surface of the electrolyte film 90, and an anode gas diffusion layer 94 joined to the anode electrode layer 93. For example, the electrode structural body 9 is fabricated by joining the cathode electrode layer 91 and the anode electrode layer 93 to the two surfaces of the electrolyte film 90 by thermal transfer, sandwiching the electrolyte film 90, the cathode electrode layer 91 and the anode electrode layer 93 by carbon papers employed as the gas diffusion layers 92, 94, and crimping.

As shown in the upper half of FIG. 2, the cathode electrode layer 91 is slightly shorter in length than the anode electrode layer 93 with respect to a longitudinal direction, and is thicker than the anode electrode layer 93. As shown in FIG. 2, a front edge region 95 located on a front end (left in FIG. 2) and a rear edge region 96 located on a rear end (right in FIG. 2) of the electrode structural body 9 with respect to the longitudinal direction include regions 95A, 96A in which neither the cathode electrode layer 91 nor the anode electrode layer 93 exist, and regions 95B, 96B in which the cathode electrode layer 91 does not exist but the anode electrode layer 93 exists, wherein the regions 95A, 96A, 95B, 96B are listed in an order starting from the respective two ends toward a center. That is, inside the electrode structural body 9, the edge regions 95, 96 located on the two ends with respect to the scanning direction F include the regions 95A, 96A in which neither the cathode electrode layer 91 nor the anode electrode layer 93 exists, and include the regions 95B, 96B in which the cathode electrode layer 91 in the two electrode layers 91 and 93 does not exist. Note that, hereinafter, an interior of the edge regions 95, 96 of the electrode structural body 9 is referred to as an inspection region 100.

In addition, as shown in the lower half of FIG. 2, the portion of the transmission image corresponding to the regions 95A, 96A where neither of the electrode layers 91 and 93 exists is lighter than the portion of the transmission image corresponding to the regions 95B, 96B where the cathode electrode layer 91 does not exist, and the portion of the transmission image corresponding to the regions 95B, 96B where the cathode electrode layer 91 does not exist is lighter than the portion of the transmission image corresponding to the inspection region 100 where both of the electrode layers exist. Moreover, as shown in the lower half of FIG. 2, differences in shade between these portions of the transmission image are greater between the region 100 and the region 95B (96B) than between the region 95A (96A) and the region 95B (96B).

Returning to FIG. 1, the inspection apparatus 1 determines whether there is a defect in the electrode structural body 9 having the above layered structure, particularly, in the part of the cathode electrode layer 91 or the anode electrode layer 93.

The X-ray CT apparatus 3 includes a plurality of (four in the example of FIG. 1) X-ray tubes (i.e. a first X-ray tube 31a, a second X-ray tube 31b, a third X-ray tube 31c and a fourth X-ray tube 31d) provided above the inspection stage 2, a plurality of (four in the example of FIG. 1, the same as the number of the X-ray tubes) X-ray detectors (i.e., a first X-ray detector 32a, a second X-ray detector 32b, a third X-ray detector 32c and a fourth X-ray detector 32d) provided below the inspection stage 2.

The X-ray tubes 31a-31d are provided above the inspection stage 2 in a row along a width direction of the electrode structural body 9 at substantially equal intervals. The X-ray tubes 31a-31d respectively irradiate X-rays to the electrode structural body 9 placed on the inspection stage 2. More specifically, as shown in FIG. 1, when the electrode structural body 9 is divided into a plurality of equal divisions (four equal divisions in the example of FIG. 1, the same as the number of the X-ray tubes) in a track shape along the width direction, the first X-ray tube 31a irradiates X-rays to a first row 90a of the electrode structural body 9, and the second X-ray tube 31b irradiates X-rays to a second row 90b of the electrode structural body 9, and the third X-ray tube 31c irradiates X-rays to a third row 90c of the electrode structural body 9, and the fourth X-ray tube 31d irradiates X-rays to a fourth row 90d of the electrode structural body 9.

The X-ray detectors 32a-32d are arranged in a row along the width direction of the electrode structural body 9 at substantially equal intervals below the inspection stage 2, so as to face the X-ray tubes 31a-31d under a configuration that the electrode structural body 9 is sandwiched between the X-ray tubes 31a-31d and the X-ray detectors 32a-32d. The X-ray detectors 32a-32d detect the X-rays emitted from the X-ray tubes 31a-31d and transmitting through the electrode structural body 9, and send a detection signal to the image processor 5. More specifically, the first X-ray detector 32a detects the X-rays emitted from the first X-ray tube 31a and transmitting through the first row 90a of the electrode structural body 9; the second X-ray detector 32b detects the X-rays emitted from the second X-ray tube 31b and transmitting through the second row 90b of the electrode structural body 9; the third X-ray detector 32c detects the X-rays emitted from the third X-ray tube 31c and transmitting through the third row 90c of the electrode structural body 9; and the fourth X-ray detector 32d detects the X-rays emitted from the fourth X-ray tube 31d and transmitting through the fourth row 90d of the electrode structural body 9.

As such, it is possible to capture the continuous X-ray transmission image along the scanning direction F of each of the rows 90a-90d of the electrode structural body 9 by the X-ray CT apparatus 3 scanning the electrode structural body 9 along the scanning direction F parallel to the longitudinal direction, in other words, by the X-ray detectors 32a-32 detecting the X-rays transmitting through the electrode structural body 9 under a situation that the X-rays are emitted from the X-ray tubes 31a-31d while the carrier device (not shown) moves the electrode structural body 9 at a predetermined speed along the scanning direction F. The X-ray CT apparatus 3 sends the X-ray transmission image of the electrode structural body 9 captured based on the above-described procedure to the image processor 5. At this time, instead of moving the electrode structural body 9 along the scanning direction F, the carrier device (not shown) may move the X-ray CT apparatus 3 along the scanning direction F.

Figure 3:
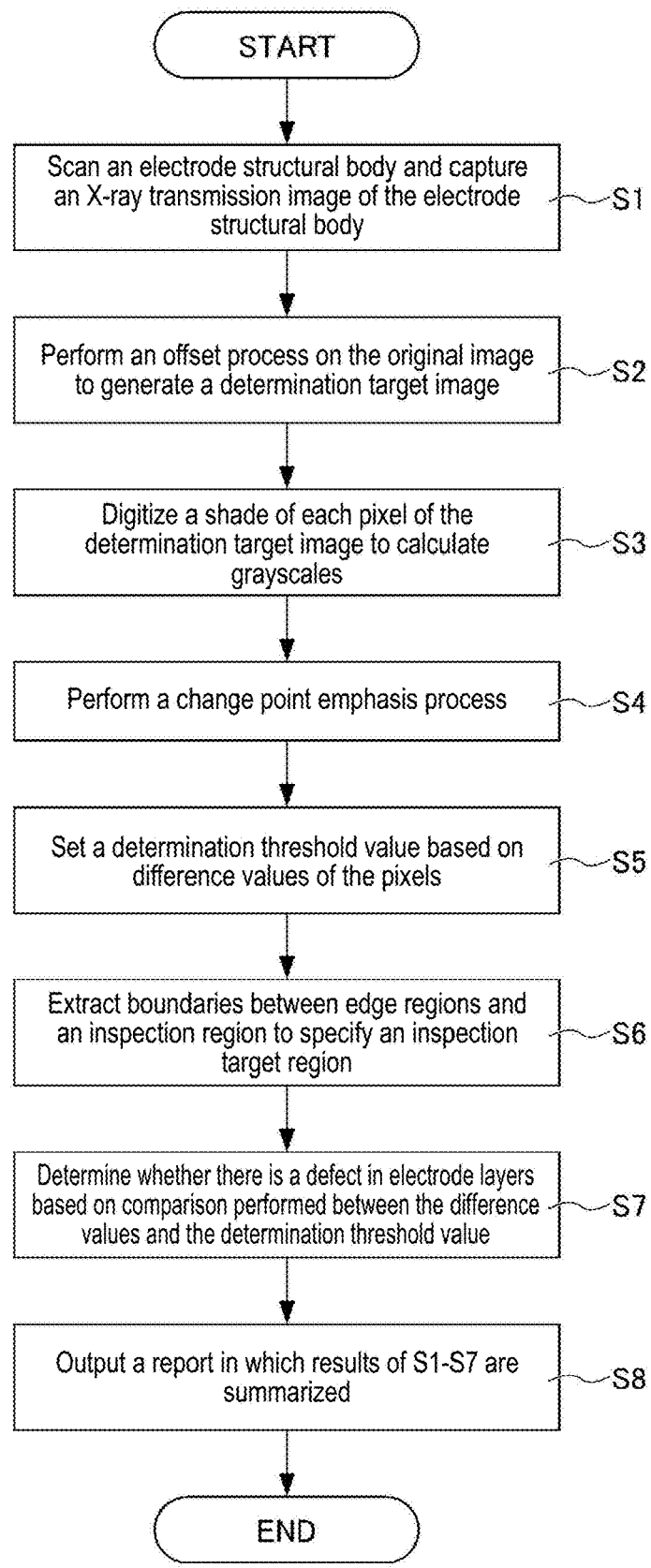
FIG. 3 is a flowchart illustrating a procedure of an inspection method for an electrode structural body which determines whether there is a defect in an electrode structural body by an inspection apparatus.
Figure 4:
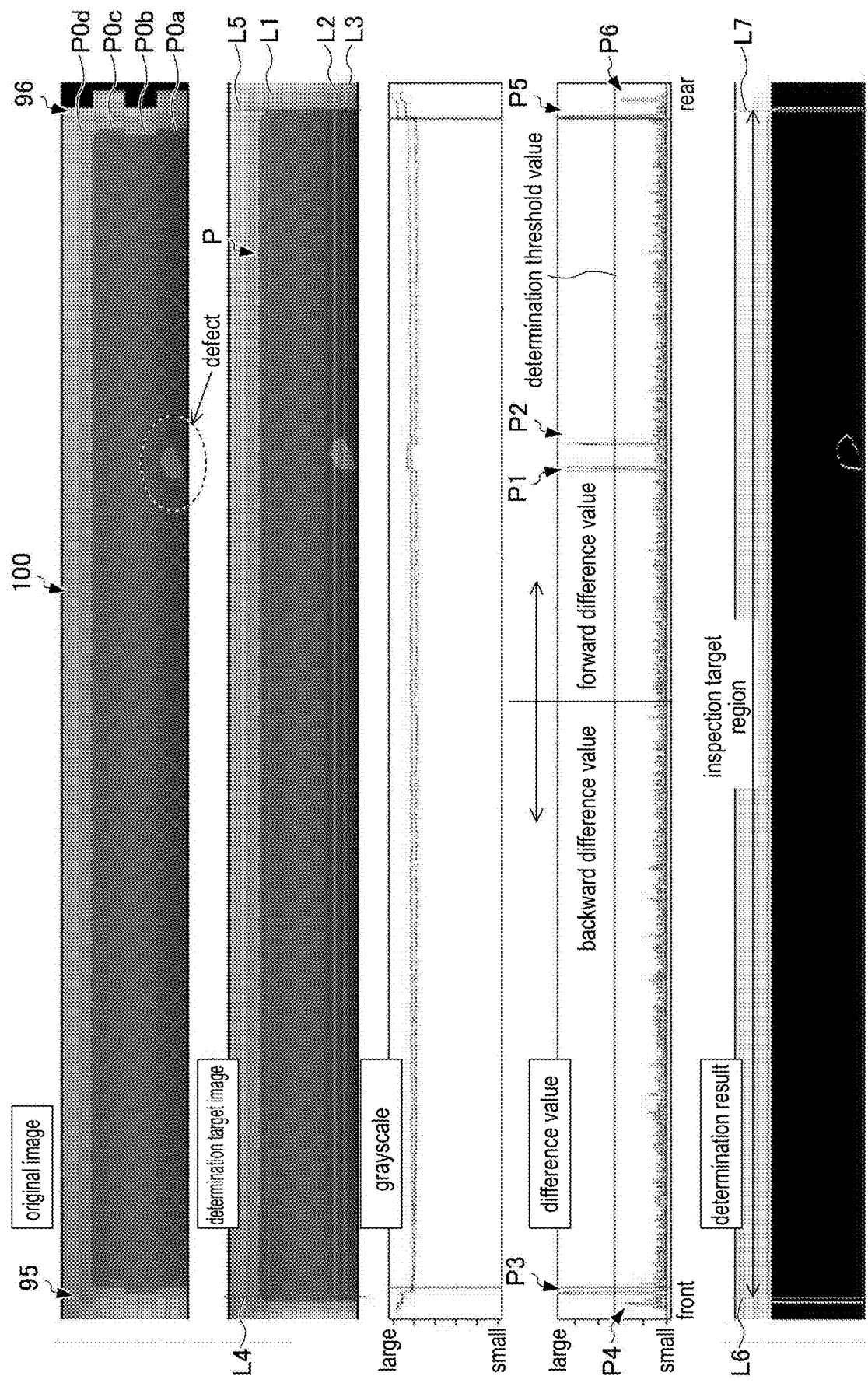
FIG. 4 is a schematic diagram illustrating information obtained in each step of the inspection method of FIG. 3.

FIG. 3 is a flowchart illustrating a procedure of an inspection method for an electrode structural body which determines whether there is a defect in the electrode structural body 9 by the inspection apparatus 1. FIG. 4 is a schematic diagram illustrating information obtained in each step of the inspection method of FIG. 3. As shown in FIG. 4, a left-right direction is the scanning direction; a left side is a front side of the scanning direction; and a right side is a rear side of the scanning direction.

In a step S1, the X-ray CT apparatus 3 scans the electrode structural body 9 along the scanning direction F, captures the continuous X-ray transmission image of the electrode structural body 9, and sends the obtained X-ray transmission image to the image processor 5. As shown at the top of FIG. 4, in the X-ray CT apparatus 3, in order to capture X-ray transmission images P0a, P0b, P0c, P0d of the respective rows 90a, 90b, 90c, 90d of the electrode structural body 9 by the four sets of X-ray tubes and X-ray detectors, positions of ends of the original images P0a-P0d are displaced along the scanning direction F. Also, as shown at the top of FIG. 4, the X-ray CT apparatus 3 scans within the range the electrode structural body 9 to include not only the inspection region 100 but also the edge regions 95, 96 located on the front side and the rear side with respect to the longitudinal direction. In addition, the example of FIG. 4 illustrates a case where a defect of the cathode electrode layer exists and locates slightly rearward of a center of the first row 90a of the electrode structural body 9.

In a step S2, the image processor 5 performs an offset process on the original images P0a-P0d obtained by the X-ray CT apparatus 3. More specifically, as shown in the second row from the top of FIG. 4, the image processor 5 aligns the positions of the ends of the original images P0a-P0d by shifting the positions of the original images P0a-P0d obtained by the X-ray CT apparatus 3 along the scanning direction F by predetermined offset distances. Hereinafter, the X-ray transmission image generated in the offset process of the step S2 will be referred to as a determination target image P.

In a step S3, the image processor 5 calculates grayscale of each pixel by digitizing shade of each pixel of the determination target image P. In the following description, the lighter (whiter) the shades of pixels are, the greater the grayscales are. In the third row from the top of FIG. 4, only the grayscales of the pixels located on lines L1, L2, L3 of the determination target image P are illustrated. As shown in FIG. 4, the grayscales of the pixels located in the portion of the cathode electrode layer where the defect exists and the edge regions 95, 96 located outside lines L4, L5 are slightly greater than the grayscales of the pixels located in the other portions.

In a step S4, the image processor 5 performs a change point emphasis process for emphasizing a change point of the grayscales according to the grayscales of the pixels calculated in the step S3. More specifically, the image processor 5 calculates a forward difference value or a backward difference value described with reference to FIG. 5 for each pixel.

Figure 5A:
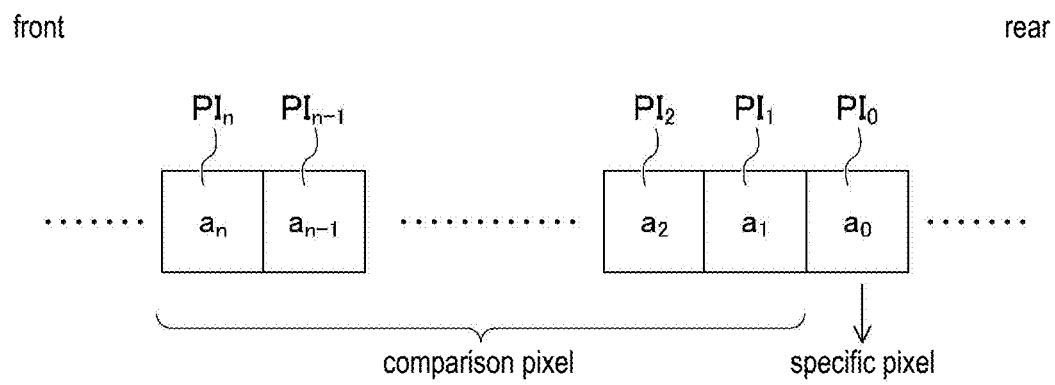
FIG. 5A is a diagram for illustrating a procedure for calculating the forward difference value in the change point emphasis process
Figure 5B:
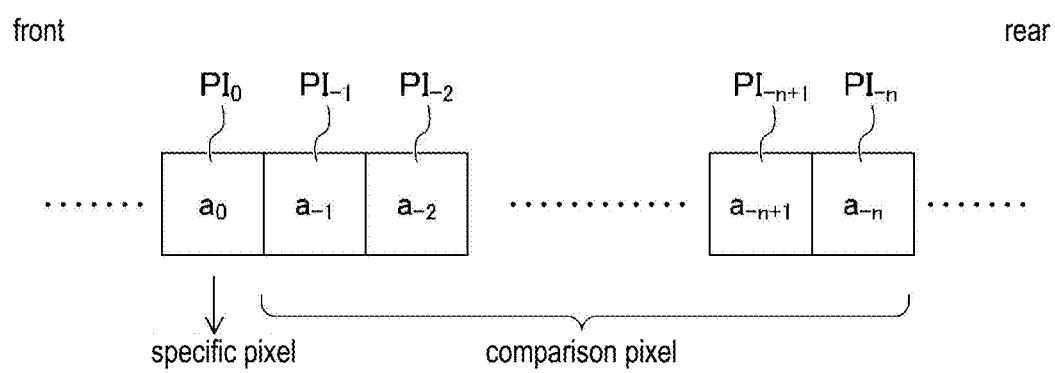
FIG. 5B is a diagram for illustrating a procedure for calculating the backward difference value in the change point emphasis process.

FIG. 5A is a diagram for illustrating a procedure for calculating the forward difference value in the change point emphasis process. FIG. 5B is a diagram for illustrating a procedure for calculating the backward difference value in the change point emphasis process. FIG. 5A illustrates n+1 (n is an arbitrary integer greater than or equal to 1) pixels $PI_0, PI_1, PI_2, \ldots, PI_{n-1}, PI_n$ arranged in order from the rear side to the front side along the scanning direction, and grayscales $a_0, a_1, a_2, \ldots, a_{n-1}, a_n$ of the pixels. In addition, FIG. 5B illustrates n+1 pixels $PI_0, PI_{-1}, PI_{-2}, \ldots, PI_{-n+1}, PI_{-n}$ arranged in order from the front side to the rear side along the scanning direction, and grayscales $a_0, a_{-1}, a_{-2}, \ldots, a_{-n+1}, a_{-n}$ of the pixels.

As shown in FIG. 5A, the image processor 5 defines the rearmost pixel $PI_0$ of the n+1 pixels $PI_0, \ldots, PI_n$ to be a specific pixel, and when the forward difference value of the specific pixel $PI_0$ is to be calculated, sets a difference value between a value calculated according to the grayscale $a_0$ of the specific pixel $PI_0$ and a value calculated according to the grayscales $a_1, \ldots, a_n$ of the n comparison pixels $PI_1, \ldots, PI_n$ adjacent to and located in front of the specific pixel $PI_0$ to be the forward difference value. More specifically, as shown in the following equation (1), the image processor 5 sets an absolute value of a value obtained by subtracting a median value of the grayscales $a_1, \ldots, a_n$ of the n comparison pixels $PI_1, \ldots, PI_n$ from the grayscale $a_0$ of the specific pixel $PI_0$ to be the forward difference value of the specific pixel $PI_0$.

$$\text{forward difference value} = |a_0 - \text{median value}[a_1, \ldots, a_n]| \quad (1)$$

As shown in FIG. 5B, the image processor 5 defines the frontmost pixel $PI_0$ of the n+1 pixels $PI_0, \ldots, PI_{-n}$ to be the specific pixel, and when the backward difference value of the specific pixel $PI_0$ is to be calculated, sets a difference value between a value calculated according to the grayscale $a_0$ of the specific pixel $PI_0$ and a value calculated according to the grayscales $a_{-1}, \ldots, a_{-n}$ of the n comparison pixels $PI_{-1}, \ldots, PI_{-n}$ adjacent to and located in rear of the specific pixel $PI_0$ to be the backward difference value. More specifically, as shown in the following equation (2), the image processor 5 sets an absolute value of a value obtained by subtracting a median value of the grayscales $a_{-1}, \ldots, a_{-n}$ of the n comparison pixels $PI_{-1}, \ldots, PI_{-n}$ from the grayscale $a_0$ of the specific pixel $PI_0$ to be the backward difference value of the specific pixel $PI_0$.

$$\text{backward difference value} = |a_0 - \text{median value} [a_{-1}, \ldots, a_{-n}]| \quad (2)$$

Returning to FIG. 4, the image processor 5 calculates the backward difference value shown in FIG. 5B for the pixels (including the pixels located in the front edge region 95) located between a center and a front end of the determination target image P along the scanning direction, and calculates the front difference value for the pixels (including the pixels located in the rear edge region 96) located between the center and a rear end of the determination target image P along the scanning direction. In the second row from the bottom of FIG. 4, only the grayscales of the pixels located on lines L1, L2, L3 of the determination target image P are illustrated.

As shown in the second row from the bottom of FIG. 4, peaks P1-P6 appear in the difference values, and are predominantly greater than difference values of the other portions. The peaks P1, P2 are equivalent to a boundary of the portion of the cathode electrode layer where there is a defect and the portion of the cathode electrode layer where there is no defect. The peaks P3, P5 are equivalent to boundaries between the inspection region 100 and the regions 95B, 96B (see FIG. 2) where the cathode electrode layer 91 of the electrode layers 91, 93 does not exist. The peaks P4, P6 are equivalent to boundaries between the regions 95B, 96B and the regions 95A, 96A (see FIG. 2) where neither of the electrode layers 91, 93 exists. Further, as shown in FIG. 2, since the cathode electrode layer is thicker than the anode electrode layer, the difference values on the peaks P3, P5 are greater than the difference values on the peaks P4, P6. Therefore, by performing the above-described kind of change point emphasis process and calculating the difference value for each pixel, the boundary between the portion of the electrode layer where there is a defect and the portion of the electrode layer where there is no defect may be more significantly emphasized as compared with identification based on grayscales.

In addition, as described in the above, during the change point emphasis process, by calculating the backward difference value for the pixels located in front of the center of the determination target image P along the scanning direction and calculating the forward difference value for the pixels located in rear of the center, it is possible to accurately specify the positions of the boundaries between the edge regions 95, 96 and the portions where the ends of the electrode layers exist. In the above-described kind of change point emphasis process, for the arbitrary integer n (i.e., the number of comparison pixels used when calculating the difference value), a value determined by performing a test in advance to emphasize the change points of the grayscales is adopted.

In a step S5, the image processor 5 sets a determination threshold value for determining whether there is a defect in the electrode layers based on the difference values calculated during the change point emphasis process. More specifically, the image processor 5 sets a product of a standard deviation of difference values obtained by removing the greatest top 10% difference values from the difference values of all pixels calculated in the change point emphasis process multiplied by a predetermined positive coefficient greater than or equal to 1 to be the determination threshold value. Alternatively, for example, a product of the difference value of the pixel, which is located at the boundaries between the inspection region 100 and the edge regions 95, 96 (i.e., the difference values of the pixels located at the peaks P3, P5), multiplied by a predetermined positive coefficient, which is less than or equal to 1, may be set as the determination threshold value.

Note that, although FIG. 4 illustrates the case where the same determination threshold value is set for all pixels, the disclosure is not limited thereto. For example, when the electrode structural body is continuously scanned by the X-ray CT apparatus along the scanning direction F, the shade of the transmission image gradually changes along the scanning direction F due to variations of the imaging environment, and a difference between the difference value of the pixel located at the boundary between the inspection region 100 and the front edge region 95 and the difference value of the pixel located at the boundary between the inspection region 100 and the rear edge region 96 arises. In such a case, the determination threshold value may be gradually adjusted along the scanning direction F. More specifically, if the shade changes at a constant rate in the interval between the pixels located in the front edge region 95 and the pixels located in the rear edge region 96 along the scanning direction F, the determination threshold value may be adjusted based on the rate along the scanning direction F. For example, the rate of shade change may be calculated by dividing the difference between the difference value of the pixels located at the boundary between the inspection region 100 and the front edge region 95 and the difference value of the pixels located at the boundary between the inspection region 100 and the rear edge region 96 by the distance defined between the front edge region 95 and the rear edge region 96.

In a step S6, the image processor 5 specifies an inspection target region by extracting the boundaries between the inspection region 100 where both of the electrode layers exist and the edge regions 95, 96 based on the difference values calculated in the change point emphasis process. As described in the above, the difference values calculated in the change point emphasis process significantly become large at the boundaries between the inspection region 100 and the edge regions 95, 96 (see the peaks P3, P5 shown in FIG. 4). Therefore, the image processor 5 specifies positions of boundaries L6, L7 between the inspection region 100 and the edge regions 95, 96 in the determination target image P by comparing the difference values of the pixels located in an interval, which is defined from the front end of the determination target image P to the rear side of the determination target image P and has a predetermined distance, and the difference values of the pixels located in an interval, which is defined from the rear end to the front side and has the predetermined distance, with the predetermined threshold value, and sets an interval between the boundaries L6, L7 to be the inspection target region. At this time, if the entire transmission image is too white for some reason, the difference values are too small, and therefore the positions of the boundaries L6, L7 (i.e., the range of the inspection target region) may not be specified. In such a case, the steps S1-S5 may be performed on the transmission image again since the transmission image is considered to be an abnormal image.

In a step S7, the image processor 5 determines whether there is a defect in the electrode layers (both or one of the cathode electrode layer and the anode electrode layer) in the inspection target region based on the comparison performed between the difference values of the pixels located in the inspection target region and the determination threshold value set in the step S5. More specifically, when the difference value of the predetermined specific pixel located in the inspection target region is greater than the determination threshold value, the image processor 5 determines that a boundary of a defect of the electrode layers (both or one of the cathode electrode layer and the anode electrode layer) exists at the specific pixel. By contrast, when the difference value is equal to or less than the determination threshold value, the image processor 5 determines that a boundary of a defect of the electrode layers does not exist at the specific pixel.

The result of the determination process of the step S7 is shown in the bottom of FIG. 4. More specifically, in the bottom of FIG. 4, the pixels which have difference values less than or equal to the determination threshold value are shown in black, and the pixels which have difference values greater than the determination threshold value are shown in white. According to the determination process of the step S7, as shown in the bottom of FIG. 4, a contour line of the portion where there is a defect in the electrode layers may be extracted. Therefore, according to the determination process of the step S7, it is possible to specify where there is a defect in the electrode layers of the electrode structural body 9 and to specify the position of the defect.

In a step S8, the image processor 5 outputs a report in which the results of the steps S1-S7 are summarized in a file format (e.g., a pdf file) which can be visually verified by an operator.

Figure 6:
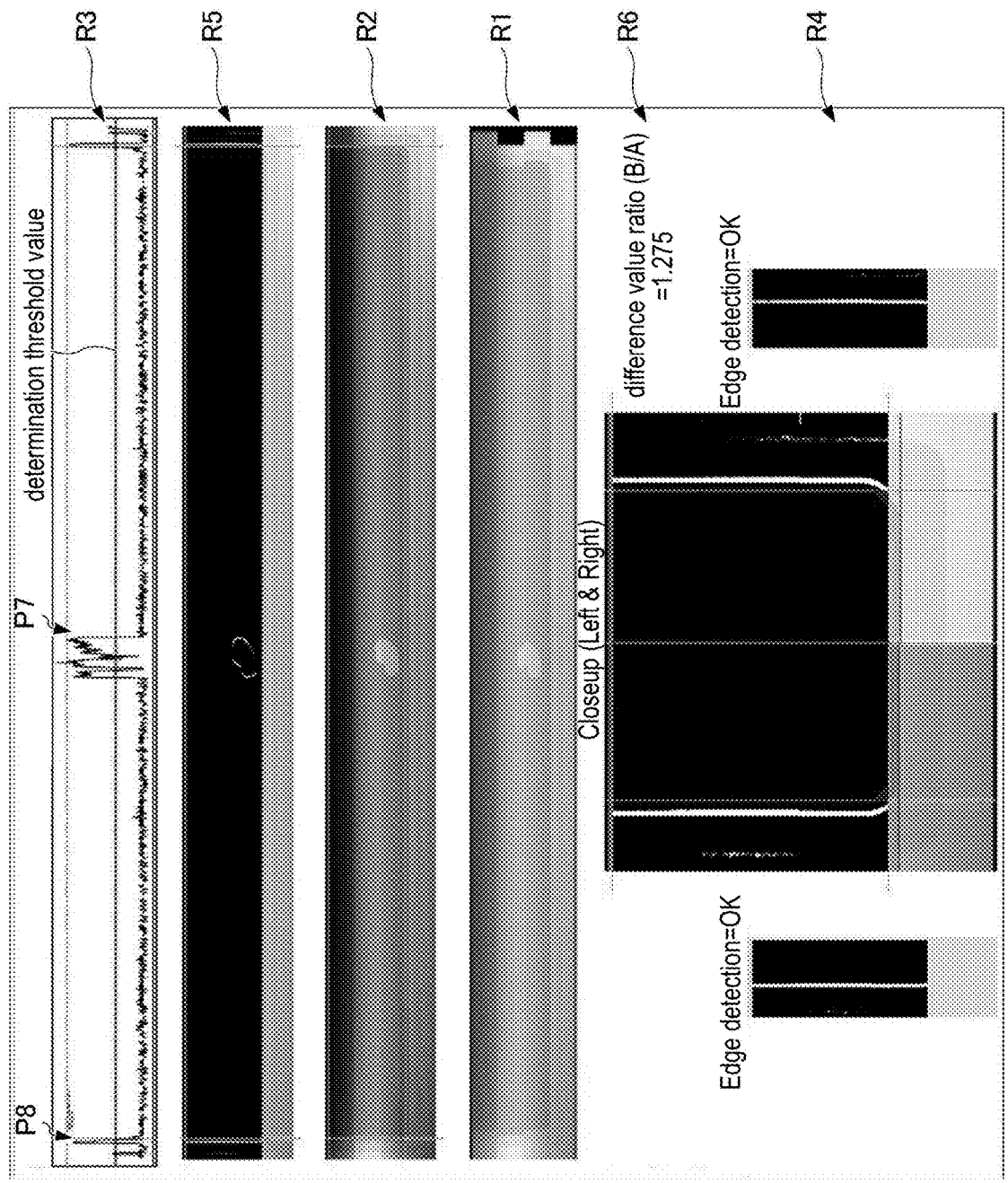
FIG. 6 is a diagram illustrating an example of a report generated in a process of a step S8 of FIG. 3 (in a case where a significant defect exists).
Figure 7:
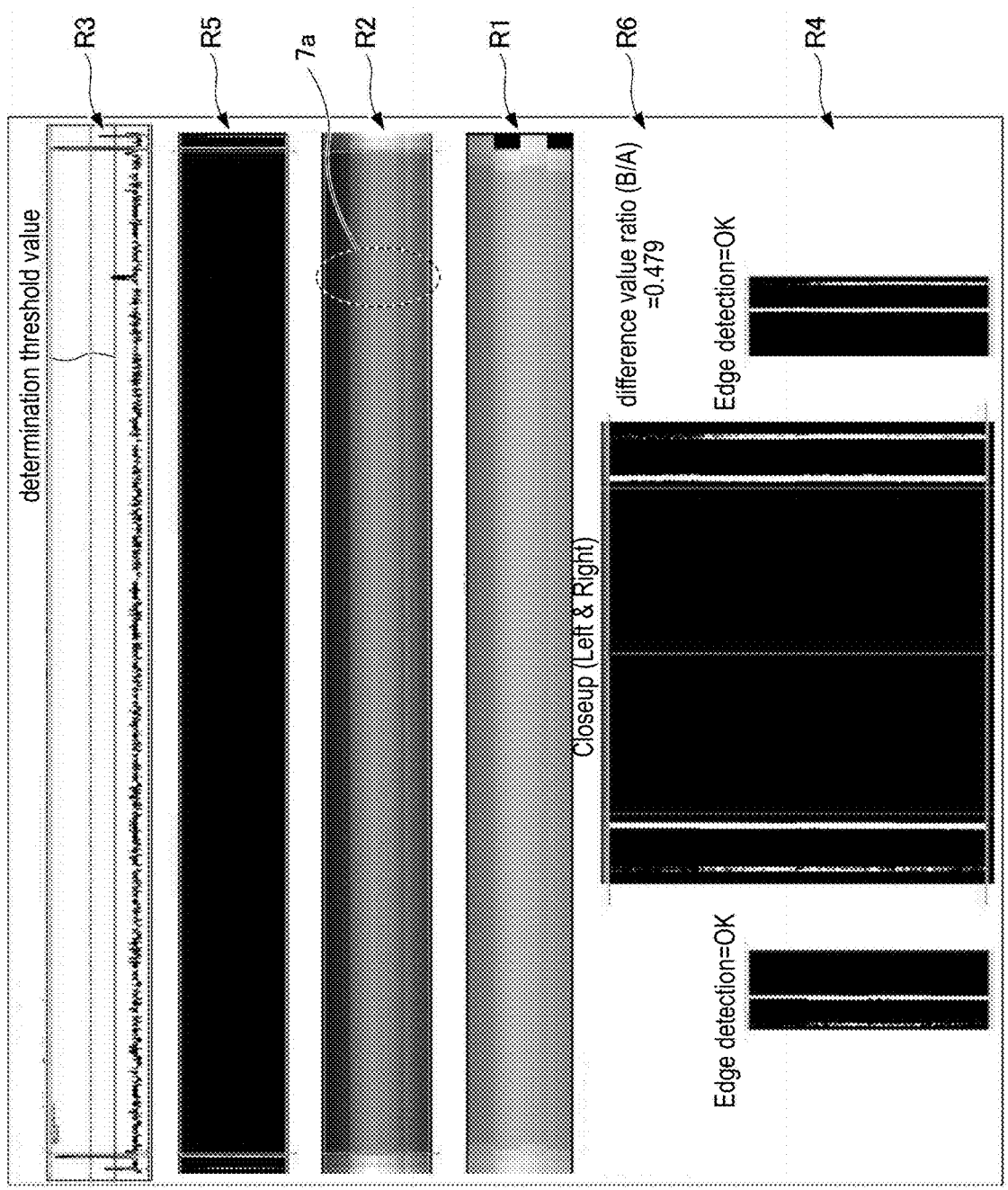
FIG. 7 is a diagram illustrating an example of a report generated in the process of the step S8 of FIG. 3 (in a case where a slight defect exists).
Figure 8:
FIG. 8 is an example of a transmission image of a membrane electrode assembly (MEA).

FIG. 6 and FIG. 7 are diagrams illustrating examples of the report generated in the step S8. In addition, FIG. 6 illustrates a case where there is a significant defect in about the center of the electrode structural body along the scanning direction. Further, FIG. 7 illustrates a case where a slight defect of about several pixels exists in the rear end side of the electrode structural body.

As shown in FIG. 6 and FIG. 7, the report includes an original image display section R1 in which the original image captured in the step S1 is displayed, a determination target image display section R2 in which the determination target image generated in the offset process of the step S2 is displayed, a difference value display section R3 in which the result of the change point emphasis process of the step S4 is displayed side by side with the original image, an edge boundary display section R4 in which the result of the step S5 is displayed, a defect boundary display section R5 in which the result of the determination process of the step S7 is displayed, and a difference value ratio display section R6 in which a ratio of a difference value of a pixel located in the edge regions 95, 96 to a difference value of a pixel where a defect is considered to exist is displayed.

In the center of the edge boundary display section R4, while surroundings of the front and rear edge regions are enlarged, the pixels which have difference values greater than the threshold value are displayed in white, and the pixels which have difference values less than or equal to the threshold value are displayed in black. Further, in the left and right sides of the edge boundary display section R4, it is indicated whether or not the boundaries of the front and rear edge regions are appropriately extracted. The operator may verify that the boundaries of the edge regions are appropriately extracted by observing the edge boundary display section R4.

As described in the above, in the change point emphasis process of the step S5, the difference value is calculated for all the pixels forming the determination target image. Under such a condition, displaying the difference values of all the pixels becomes complicated. Therefore, in the difference value display section R3 of the report, the greatest difference value of multiple adjacent pixels along the width direction of the determination target image is displayed together with the determination threshold value, and is plotted side by side with the original image of the original image display section R1 along the scanning direction. In the defect boundary display section R5, the pixels which have difference values less than or equal to the determination threshold value are displayed in black, and the pixels which have difference values greater than the determination threshold value are displayed in white. As such, the operator may verify the position, the size, and the like of the defect of the electrode layers which is determined to be present in the determination target image by observing the difference value display section R3 and the defect boundary display section R5.

In the difference value display section R3, by plotting the difference value for all the pixels including the edge regions 95, 96 along the scanning direction F, it is possible to estimate to some extent whether the defect of the electrode layers is present in the cathode electrode layer or in the anode electrode layer. That is, when the difference value (for example, see the peak P7 shown in FIG. 6) of the position where it is determined that there is a defect in the electrode layers is about the same as the difference value (see the peak P8 shown in FIG. 6) located at the boundaries between the inspection region 100 where both of the electrode layers exist and the regions 95B, 96B where the cathode electrode layer 91 of the electrode layers 91, 93 does not exist, it may be estimated that there is a defect in the cathode electrode layer. In addition, when the difference value (for example, see the peak P7 shown in FIG. 6) of the position where it is determined that there is a defect in the electrode layers is less than the difference value (see the peak P8 shown in FIG. 6) located at the boundaries between the inspection region 100 where both of the electrode layers exist and the regions 95B, 96B where the cathode electrode layer 91 of the electrode layers 91, 93 does not exist, it may be estimated that there is a defect in the anode electrode layer.

Also, in the difference value ratio display section R6, a ratio B/A of a maximum B of the difference values, which exceed the determination threshold value and are in the inspection region 100, to a difference value A, which appears at the boundaries between the inspection region 100 and the edge regions 95, 96 and is extracted in the step S6, is displayed. As such, a depth of the defect may be estimated to some extent. Specifically, it may be estimated that the greater the difference value ratio (B/A) is, the deeper the defect is in the electrode layers.

Advantages of outputting the above-described kind of report will be described below. First, according to the example of the report shown in FIG. 6, the operator may recognize that there is a significant defect just by glancing at the original image. In comparison, according to the example of the report shown in FIG. 7, although the operator may not be able to recognize that there is a defect just by glancing at the original image, it is possible to mark an area where there is a defect by a broken line 7a in the determination target image by referring to the difference value display section R3. In such a case, the operator may enlarge the area marked by the broken line 7a in the determination target image and visually inspect the area closely to determine whether the size of the defect is acceptable.

In practice, the example shown in FIG. 6 is extremely rare, while cases similar to the example shown in FIG. 7, in which the presence or absence of a defect may not be identified by a single glance, are frequent. For this reason, according to an exemplary embodiment, in a case of determining the presence/absence of defects in large numbers of electrode structural bodies, it is preferable that after the report is automatically generated by the inspection apparatus 1 (first inspection step), the operator refers to the report and performs close visual inspection (second inspection step). As such, it is possible to determine the presence or absence of a defect in a shorter time and with higher accuracy as compared with the case of closely visually inspecting the determination target images of all the electrode structural bodies.

According to the inspection method for an electrode structural body of the disclosure, the following effects are accomplished. (1) According to the inspection method, the continuous transmission image of the electrode structural body 9 is obtained by scanning the electrode structural body 9 along the scanning direction, and thereafter the grayscale of each pixel of the obtained transmission image is digitized. According to the inspection method, the difference value between the value calculated according to the grayscale of the predetermined specific pixel and the value calculated according to the grayscales of the comparison pixels located in front or rear of the specific pixel along the scanning direction is calculated, and the presence or absence of a defect is determined based on the comparison performed between the difference value and the predetermined threshold value. Therefore, according to the inspection method, by calculating the difference value for each pixel of the transmission image in order by the image processor 5, it is possible to determine whether there is a defect in a shorter time as compared with the case of visually inspecting the transmission image. Further, as described in the above, when the electrode structural body 9 is continuously scanned by the X-ray CT apparatus 3, the shade of the transmission image may gradually change along the scanning direction due to variations of the imaging environment. Therefore, if the presence or absence of a defect is determined only by the grayscale of the specific pixel, it may be erroneously determined. In comparison, according to the inspection method, the difference value between the grayscale of the specific pixel and the value calculated based on the grayscales of the comparison pixels located in front or rear of the specific pixel along the scanning direction F is used. As such, since a boundary between the region where the defect exists and the region where a defect does not exists may be captured and regarded as a sharp change in shade along the scanning direction F of the transmission image, it is possible to determine whether there is a defect with high accuracy regardless of the variations of the imaging environment during scanning.

(2) On the two sides of the electrode structural body 9, there are the edge regions 95, 96 in which neither of the cathode electrode layer 91 and the anode electrode layer 93 exists, or one of the cathode electrode layer 91 and the anode electrode layer 93 does not exist. Since the edge regions 95, 96 do not directly contribute to power generation, there is no need to determine whether there is a defect therein. Therefore, according to the inspection method, the scanning is performed to include the edge regions 95, 96 which are not required to be inspected, and the difference value is calculated under a configuration that a pixel located in the edge regions 95, 96 is set as the specific pixel. As such, since the boundaries between the edge regions 95, 96, where neither of the electrode layers 91, 93 exists or one of the electrode layers 91, 93 does not exist, and the portion, where both of the electrode layers 91, 93 exist, may be identified, the region to be inspected for the presence or absence of the defect may be specified.

(3) According to the inspection method, the determination threshold value is set based on the difference values calculated under a configuration that a pixel located in the regions 95A, 95B, in which the electrode layers 91, 93 surely do not exist, is used as the specific pixel. As such, it is possible to accurately determine whether there is a defect according to the difference values on the regions 95A, 95B.

(4) When the electrode structural body 9 is scanned along the scanning direction F by the X-ray CT apparatus 3 as described in the above, the shade of the transmission image may gradually change due to variations of the imaging environment. Therefore, according to the inspection method, the n pixels adjacent to and located in front or rear of the specific pixel along the scanning direction F are defined as the comparison pixels, and the difference between the grayscale of the specific pixel and the median value of the grayscales of the n comparison pixels is calculated and used as the difference value. As a result, since it is possible to emphasize a sharp change in difference values while a gradual change in shade caused by the variations of the imaging environment is ignored, it is possible to more accurately determine whether there is a defect.

(5) According to the inspection method, the report including the original image display section R1, which displays the original image obtained in the step S1, and the difference value display section R3, which displays the difference values calculated in the change point emphasis process of the step S4 side by side with the original image, is outputted. By outputting this kind of report, convenience of visual inspection performed by the operator may be enhanced. That is, even if it is difficult to recognize a defect merely by glancing at the original image, the operator may mark the area where the defect is considered to exist by referring to the difference value display section R3. In addition, the area of the original image where a defect is considered to exist may be enlarged to determine whether a size of the present defect is acceptable by close visual inspection.

Although an embodiment of the disclosure is described in the above, the disclosure is not limited thereto. The detailed configuration may be accordingly adjusted without departing from the spirit and scope of the disclosure.

For example, according to the above embodiment, although a case has been described in which the cathode electrode layer 91 has a shorter length along the longitudinal direction than the anode electrode layer 93, the disclosure is not limited thereto. According to the disclosure, a configuration that the length of the cathode electrode layer along the longitudinal direction is equal to or longer than that of the anode electrode layer is also applicable to the electrode structural body.

What is claimed is:

1. An inspection method for an electrode structural body, the inspection method determining by a computer whether there is a defect in the electrode structural body comprising a cathode electrode layer, an electrolyte layer and an anode electrode layer, the inspection method comprising:
    a first step comprising scanning the electrode structural body along a scanning direction to obtain a continuous transmission image of the electrode structural body;
    a second step comprising digitizing a shade of each pixel of the transmission image;
    a third step comprising calculating a difference value between a value calculated according to a grayscale of a specific pixel and a value calculated according to a plurality of grayscales of a plurality of comparison pixels located in front or rear of the specific pixel along the scanning direction; and a fourth step comprising determining presence or absence of the defect according to a comparison performed between the difference value and a predetermined threshold value, wherein in an edge region located on two sides of the electrode structural body with respect to the scanning direction, neither of the cathode electrode layer and the anode electrode layer exists, or one of the cathode electrode layer and the anode electrode layer does not exist, the first step further comprises scanning to include the edge region of the electrode structural body, and the third step further comprises calculating the difference value by setting at least one pixel located in the edge region to be the specific pixel.

2. The inspection method of claim 1, wherein the threshold value is set according to the difference value calculated in the third step.

3. The inspection method of claim 2, wherein the third step further comprises:

defining a plurality of pixels adjacent to and located in front or rear of the specific pixel along the scanning direction to be the plurality of comparison pixels; and calculating a difference between the grayscale of the specific pixel and a median value of the plurality of grayscales of the plurality of comparison pixels, wherein the difference is used as the difference value.

4. The inspection method of claim 1, further comprising a fifth step comprising outputting a report comprising:

an original image display section displaying an original image obtained in the first step; and a difference value display section displaying the difference value calculated in the third step side by side with the original image.

5. The inspection method of claim 2, further comprising a fifth step comprising outputting a report comprising:

an original image display section displaying an original image obtained in the first step; and a difference value display section displaying the difference value calculated in the third step side by side with the original image.

6. The inspection method of claim 3, further comprising a fifth step comprising outputting a report comprising:

an original image display section displaying an original image obtained in the first step; and a difference value display section displaying the difference value calculated in the third step side by side with the original image.

* * * * *